Dec. 15, 1959
A. J. HUSAK
2,916,967
DUAL REAR VIEW MIRROR HAVING ANTI
RATTLING MEANS FOR MOTOR VEHICLES
Filed Sept. 29, 1954
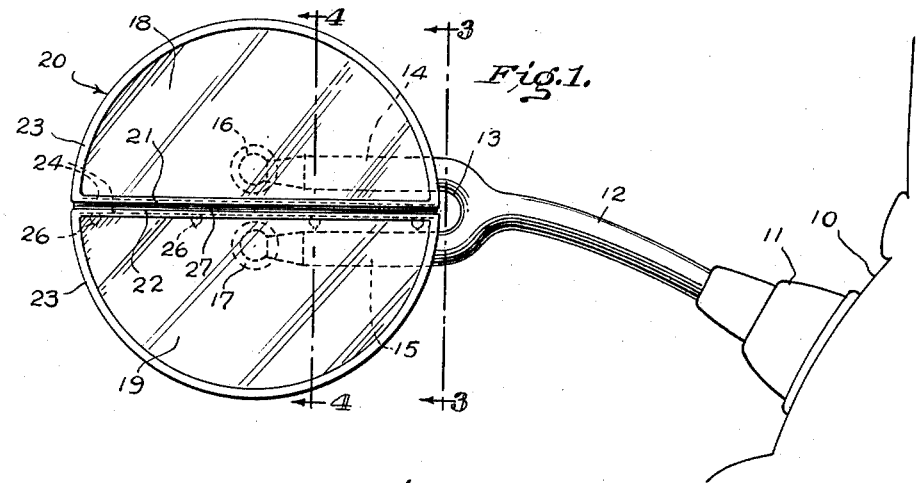
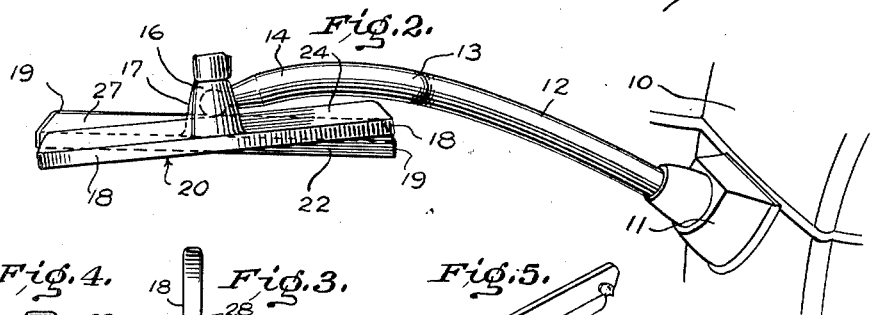
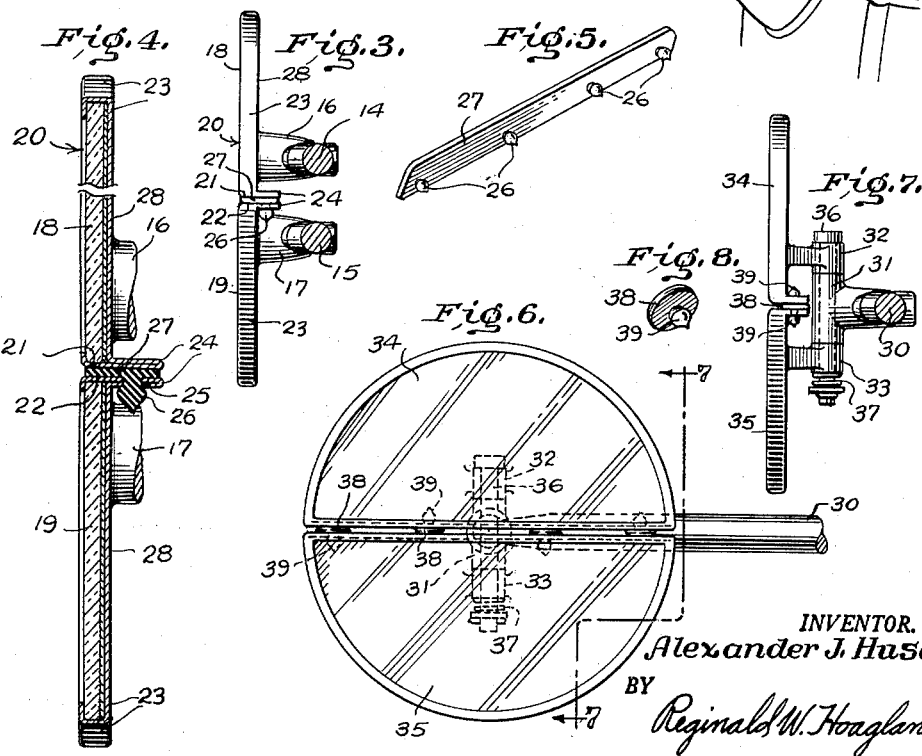
INVENTOR.
Alexander J. Husak
BY
Reginald W. Hoagland
ATTORNEY щ
United States Patent Office 2,916,967
Patented Dec. 15, 1959

2,916,967

DUAL REAR VIEW MIRROR HAVING ANTI RATTLING MEANS FOR MOTOR VEHICLES

Alexander J. Husak, Flint, Mich.

Application September 29, 1954, Serial No. 459,122

2 Claims. (Cl. 88—86)

The present invention relates to rear view mirrors for motor vehicles and aims to provide a novel and improved device of this character that enables a driver of a vehicle equipped with the improved mirror to observe vehicles that are trailing in the same lane of traffic and others that are passing.

Generally, there is provided a pair of mirror sections separately swiveled on the same supporting arm for adjustment of one to see vehicles directly behind, and adjustment of the other to see vehicles attempting to pass. Both mirrors are semicircular and are associated relative to one another to give the appearance of a single circular mirror. The divided mirror has the adjacent straight edge portions on its pair of sections slightly spaced from one another by having therebetween narrow non-chattering material, said straight edge portions of said sections are preferably parallel with one another and are on substantially horizontal planes.

It is accordingly an object of the invention to provide a novel divided mirror with independent adjustments for the sections thereof.

Another object of the invention is to provide, in a device of the character set forth, a novel arm construction for supporting a pair of mirrors.

A further object of the invention is to provide, in a device of the character set forth, novel mirror frame constructions for a pair of closely associated mirrors.

A further object of the invention is to provide, in a device of the character set forth, a novel construction for dampening vibrations of a pair of closely associated mirrors.

It is also an object of the invention to provide a device of the above-indicated character which is simple and substantial in construction, inexpensive to manufacture and yet effective and efficient in use.

Other and further objects of the invention will become apparent from a reading of the following specification taken in conjunction with the drawing, in which:

Figure 1 is a rear elevation of an embodiment of the invention as viewed by the driver of a vehicle;

Figure 2 is a top plan of the same;

Figure 3 is a vertical section taken on line 3—3 of Figure 1;

Figure 4 is an enlarged vertical section taken on line 4—4 of Figure 1;

Figure 5 is a perspective view of a strip of non-chattering material placed between the mirror sections;

Figure 6 is a fragmentary view similar to a portion of Figure 1, showing a slightly modified form of invention;

Figure 7 is a vertical section taken on line 7—7 of Figure 6; and,

Figure 8 is a perspective view of a button type of non-chattering material used in the forms of invention shown in Figures 6 and 7.

Referring more particularly to Figures 1 through 5 of the drawing, there are shown in Figures 1 and 2 and indicated by the numeral 10 small portions of the outer side of a motor vehicle at a location along the driver's side and where the front door is hinged. Clamped to a flange of the door is an attaching bracket 11 that adjustably supports an outstanding arm 12. The bracket 11 is of a type now commonly used, and the detail construction thereof does not form a part of the present invention. The arm 12, with the exception of its outer end portion which is forked, as at 13, is of the same general shape as that of the usual mirror-supporting arm in that it extends slightly upwardly and forwardly from the bracket 11 prior to being curved rearwardly. The forked portion 13 of the arm 12 comprises a pair of substantially horizontal extending branch arms 14 and 15 spaced apart while being rearwardly curved as above-mentioned and with one branch directly above the other. The outer extremities of the branch arms 14 and 15 are provided with ball elements (shown in dotted lines) of ball and socket universal connections 16 and 17, respectively, while rigidly secured to the socket elements of said universal connections 16 and 17 are mirror sections 18 and 19, respectively, of a divided mirror 20.

The divided mirror 20 is circular and has independent halves separated along substantially the horizontal center thereof, thus providing the semicircular mirror sections 18 and 19 with adjacent and substantially parallel straight edge portions 21 and 22, respectively, as clearly shown in Figure 1. Each mirror section 18 and 19 has a frame construction 23 that includes a laterally protruding flange 24 along its straight edge portion that projects in a direction opposite to the image-reflecting side thereof. In one of the flanges 24, there is provided a plurality of perforations 25 through which are forced small knobs 26 on a strip of rubber or other non-chattering material 27 for attachment of said strip in a position between the flanges 24 of the frames of both mirror sections. It is to the back plates 28 of the mirror frames 23 that socket elements of the ball and socket universal connections 16 and 17 protrude and are secured.

The depth of lateral protrusion of the flanges 24 and width of the strip 27 are sufficient to retain contact with each other throughout the line of debarkation upon adjustment of the mirror sections 18 and 19 relative one another for observation of vehicles both trailing and passing in the different mirror sections. Such resilient contact aids in the retention of the mirror sections in adjusted positions and also prevents chattering of the closely associated sections against one another due to vibrations.

It will be noted that the construction shown in Figures 6 through 8 represents a slight modification of the structure just described. In this structure, the arm support 30 is not bifurcated, but instead has a vertically extending tubular enlargement 31 on its outer extremity to which are pivotally connected, both above and below, lug extensions 32 and 33 of mirror sections 34 and 35 by a bolt 36 extended through both lugs and said tubular enlargement. The bolt 35 provides separate vertical pivots for the mirror sections and yieldably holds said sections toward one another by supporting a spring 37 in engagement with one of the lugs 32 or 33 while its head engages the other of said lugs. This form of invention further differs in that a plurality of button-shaped resilient elements 38 with individual knobs 39 thereon are used as spacers between the mirror sections 33 and 34. While some of the buttons 38 are shown as being carried by one mirror section and others carried by the other mirror section, it is to be understood that all buttons can be attached to one section and have surface engagement with the other section.

In view of the foregoing description taken in conjunction with the accompanying drawings, it is believed that a clear understanding of the construction, operation, and advantages of the device will be quite apparent to those skilled in the art. A more detailed description is accordingly deemed unnecessary.

While I have herein described specfiic forms which the invention may take, it will be understood that changes and modifications may be made which still fall within the spirit and scope of the appended claims.

What is claimed is:

1. A rear view mirror for motor vehicles comprising an arm adapted for attachment to a vehicle, a mirror divided horizontally and substantially through the center thereof into a pair of mirror sections having straight adjacent marginal edges that are in close proximity to one another, straight lateral protruding flanges extending horizontally along sides of the adjacent straight marginal portions of said mirror sections, said flanges projecting in a direction opposite to the image-reflecting side of said mirror sections and providing therewith surface areas of increased widths facing one another, yieldable material fixed on the widened surface area of at least one of said mirror sections and in frictional engagement with the widened surface area of the other of said sections, and attaching means for said mirror sections to said arm that permit adjustment of said mirror sections on substantially vertical axes and relative to one another while still maintaining engagement of the widened surface areas of both mirror sections with said yieldable material positioned therebetween.

2. A rear view mirror for motor vehicles comprising an arm adapted for attachment to a vehicle, a mirror divided horizontally and substantially through the center thereof into a pair of mirror sections having straight adjacent marginal edge surfaces that are in close proximity to one another, straight lateral protruding flanges extending horizontally along sides of the adjacent straight marginal portions of said mirror sections and projecting in a direction opposite to the image-reflecting side of said mirror sections, said lateral flanges having their adjacent surfaces on the same horizontal planes as that of said adjacent marginal edge surfaces of the mirror sections and thereby providing with these coplanar surfaces wider surface areas facing one another, yieldable material fixed on the widened surface area of at least one of said mirror sections and in frictional engagement with the widened surface area of the other of said sections, and adjustable attachments of said mirror sections to said arm that permit turning of said mirror sections on substantially vertical axes and relative to one another while still maintaining engagement of the widened surface areas of both mirror sections with said yieldable material positioned therebetween.

References Cited in the file of this patent

UNITED STATES PATENTS

| | | |
|---|---|---|
| 1,114,559 | Weed | Oct. 20, 1914 |
| 1,362,856 | Drake et al. | Dec. 21, 1920 |
| 1,547,794 | Curry | July 28, 1925 |
| 1,915,249 | Jorgensen | June 20, 1933 |
| 1,960,137 | Brown | May 22, 1934 |
| 1,974,160 | Peirson | Sept. 18, 1934 |
| 2,357,720 | Quintile | Sept. 5, 1944 |
| 2,455,669 | Gagnier | Dec. 7, 1948 |
| 2,663,224 | Younglove | Dec. 22, 1953 |